US008219511B2

(12) United States Patent
Yang et al.

(10) Patent No.: US 8,219,511 B2
(45) Date of Patent: Jul. 10, 2012

(54) UNBIASED ACTIVE LEARNING

(75) Inventors: Linjun Yang, Beijing (CN); Bo Geng, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 12/391,511

(22) Filed: Feb. 24, 2009

(65) Prior Publication Data

US 2010/0217732 A1 Aug. 26, 2010

(51) Int. Cl.
*G06F 15/18* (2006.01)
*G06F 17/10* (2006.01)
*G06N 3/08* (2006.01)

(52) U.S. Cl. .......... 706/45; 706/20; 706/21; 706/25
(58) Field of Classification Search .......... 706/45
See application file for complete search history.

(56) References Cited

U.S. PATENT DOCUMENTS

| 7,158,970 B2 | 1/2007 | Chang et al. |
| 2004/0205482 A1 | 10/2004 | Basu et al. |
| 2005/0021290 A1 | 1/2005 | Velipasaoglu et al. |
| 2005/0021357 A1* | 1/2005 | Schuetze et al. ............ 705/1 |
| 2005/0050087 A1 | 3/2005 | Milenova et al. |
| 2008/0103996 A1 | 5/2008 | Forman et al. |
| 2008/0126273 A1 | 5/2008 | Carus et al. |

OTHER PUBLICATIONS

Geng et al. (Geng), "Unbiased Active Learning for Image Retrieval" [online], 2008 [retrieved on Dec. 28, 2011]. Retrieved from the Internet: <URL:http://ieeexplore.ieee.org/stamp/stamp.jsp?ar-number=04607687>.*
Bach, "Active Learning for Misspecified Generalized Linear Models", retrieved on Dec. 4, 2008 at <<http://www.di.ens.fr/~fbach/nips_active_fbach.pdf>>, Advances in Neural Information Processing Systems 19, MIT Press, Cambridge, MA, 2007, pp. 65-72, 8 pages.
Bickel, et al., "Discriminative Learning for Differing Training and Test Distributions", retrieved on Dec. 4, 2008 at <<http://www.mpi-inf.mpg.de/~bickel/publications/bickel_icml_2007.pdf>>, Proceedings of the 24th International Conference on Machine Learning, Corvallis, Oregon, 2007, 8 pages.
Burges, "A Tutorial on Support Vector Machines for Pattern Recognition", retrieved on Dec. 4, 2008 at <<http://www.umiacs.umd.edu/~joseph/support-vector-machines4.pdf>>, Kluwer Academic Publishers, Boston, 1998, pp. 121-167.

(Continued)

*Primary Examiner* — Jeffrey A Gaffin
*Assistant Examiner* — Nathan Brown, Jr.
(74) *Attorney, Agent, or Firm* — Lee & Hayes, PLLC

(57) ABSTRACT

Techniques described herein create an accurate active-learning model that takes into account a sample selection bias of elements, such as images, selected for labeling by a user. These techniques select a first set of elements for labeling. Once a user labels these elements, the techniques calculate a sample selection bias of the selected elements and train a model that takes into account the sample selection bias. The techniques then select a second set of elements based, in part, on a sample selection bias of the elements. Again, once a user labels the second set of elements the techniques train the model while taking into account the calculated sample selection bias. Once the trained model satisfies a predefined stop condition, the techniques use the trained model to predict labels for the remaining unlabeled elements.

20 Claims, 5 Drawing Sheets

OTHER PUBLICATIONS

Campbell, et al., "Query Learning with Large Margin Classifiers", retrieved on Dec. 4, 2008 at <<http://citeseerx.ist.psu.edu/viewdoc/download;jsessionid=E5F0ED4495B0DE965D6E865431BF56A0?doi=10.1.1.43.261&rep=rep1&type=pdf>>, In the Proceedings of the Seventeenth International Conference on Machine Learning, Stanford University, USA, Morgan Kaufmann Publishers Inc., Jun. 29-Jul. 2, 2000, pp. 111-118, 8 pages.

Chang, et al., "Support Vector Machine Concept-Dependent Active Learning for Image Retrieval", retrieved on Dec. 4, 2008 at <<http://www.robotics.stanford.edu/~stong/papers/chang-tong-goh-chang-ieeemm.pdf>> IEEE Transactions on Multimedia, 2005, pp. 1-35.

Dumais, et al., "Inductive Learning Algorithms and Representations for Text Categorization", retrieved on Dec. 4, 2008 at <<http://research.microsoft.com/~jplatt/cikm98.pdf>>, ACM, Proceedings of the seventh International Conference on Information and Knowledge Management, 1998, pp. 148-155, 8 pages.

Hoi, et al., "A Semi-Supervised Active Learning Framework for Image Retrieval", retrieved on Dec. 4, 2008 at <<ieeexplore.ieee.org/iel5/9901/31473/01467457.pdf>>, IEEE Computer Society Conference on Computer Vision and Pattern Recognition, 2005, vol. 2, Jun. 20-25, 2005, pp. 302-309, 8 pages.

Huang, et al., "Correcting Sample Selection Bias by Unlabeled Data", retrieved on Dec. 4, 2008 at <<http://books.nips.cc/papers/files/nips19/NIPS2006_0915.pdf>>, in NIPS, 2006, 8 pages.

MacArthur, et al., "Relevance Feedback Decision Trees in Content-Based Image Retrieval", retrieved on Dec. 4, 2008 at <<http://cobweb.ecn.purdue.edu/RVL/Publications/MacArther00Relevance.pdf>>, Proceedings of the IEEE Workshop on Content-Based Access of Image and Video Libraries, 2000, 5 pgs.

Nguyen, et al., "Active Learning using Preclustering", retrieved on Dec. 4, 2008 at <<http://kingman.cs.ualberta.ca/_banff04/icml/pages/papers/94.pdf>>, Proceedings of the 21st International Conference on Machine Learning, Banff, Canada, 2004, 8 pages.

Platt, "Probabilistic Outputs for Support Vector Machines and Comparisons to Regularized Likelihood Methods", retrieved on Dec. 4, 2008 at <<http://citeseerx.ist.psu.edu/viewdoc/download;jsessionid=F95388F31920AFED7C908DAD1A2D2D2 7?doi=10.1.1.41.1639&rep=rep1&type=pdf>>, in Advances in Large Margin Classifiers, 1999, pp. 61-74, 11 pgs.

Rubens, et al., "Coping with Active Learning with Model Selection Dilemma: Minimizing Expected Generalization Error", retrieved on Dec. 4, 2008 at <<http://hrstc.org/docs/alms_ibis.pdf>>, Workshop on Information-Based Induction Sciences, Osaka, Japan, Oct. 31-Nov. 2, 2006, 6 pages.

Schohn, et al., "Less is More: Active Learning with Support Vector Machines," Proceedings of the Seventeenth International Conference on Machine Learning, Morgan Kaufmann Publishers Inc., 2000, pp. 839-846, 8 pgs.

Schohn, et al., "Less is More: Active Learning with Support Vector Machines", retrieved on Dec. 4, 2008 at <<http://www.lri.fr/~sebag/Examens_2006/ActiveCohn_presentation.pdf>>, 2006, 10 pages.

Shelton, "Summary of Tom M. Mitchell's 'Generalization as Search'", available at <<http://xenon.stanford.edu/~pdoyle/quail/summaries/learning-mitchell-summary.html>>, Stanford Computer Science, Patrick Doyle, Quail '97 Home Page (These Web pages are references for Ph.D. students at Stanford University studying for the qualifying exam in Artificial Intelligence), 1997, 4 pgs.

Smeulders, et al., "Content-Based Image Retrieval at the End of the Early Years", retrieved on Dec. 4, 2008 at <<ieeexplore.ieee.org/iel5/34/19391/00895972.pdf>>, IEEE Transactions on Pattern Analysis and Machine Intelligence, vol. 22, No. 12, Dec. 2000, pp. 1349-1380.

Tong, et al., "Support Vector Machine Active Learning with Applications to Text Classification", retrieved on Dec. 4, 2008 at <<http://jmlr.csail.mit.edu/papers/volume2/tong01a/tong01a.pdf>>, Journal of Machine Learning Research, 2001, pp. 45-66.

Wang, et al., "Bootstrapping SVM Active Learning by Incorporating Unlabelled Images for Image Retrieval", retrieved on Dec. 4, 2008 at <<http://users.rsise.anu.edu.au/~wanglei/My_papers/SVM_Active_CVPR03.pdf>>, IEEE Computer Society Conference on Computer Vision and Pattern Recognition, Jun. 18-20, 2003, vol. 1, 6 pages.

Zadrozny, "Learning and Evaluating Classifiers under Sample Selection Bias", retrieved on Dec. 4, 2008 at <<http://www.research.ibm.com/dar/papers/pdf/samplesel.pdf>>, Proceedings of the 21st International Conference on Machine Learning, Banff, Canada, 2004, 8 pages.

Zhou, et al., "Relevance Feedback in Image Retrieval: A Comprehensive Review", retrieved on Dec. 4, 2008 at <<http://www.ifp.uiuc.edu/~xzhou2/Research/papers/Selected_papers/ACM_MSJ.pdf>>, ACM, 2001, 25 pages.

\* cited by examiner

UNBIASED ACTIVE LEARNING

BACKGROUND

Nearly all of tasks, which need to learn a classifier or regression model, require some amount of samples labeled. For instance, if we will learn a concept detector for "cat", we need to label some amount of "cat" images and some non-cat images so that a concept detector can be learned from them. The learned concept detector can be used to determine the relevance of an image to the query "cat" provided to a search engine.

However, labeling efforts are often expensive in terms of the human labor that is involved in labeling large sets of samples. Thus, in many instances it is difficult to label a sufficiently large amount of samples. Active learning techniques can be utilized to reduce the amount of labeled samples. In other words, given the same amount of labeling efforts, active learning can lead to a better classifier than a traditional passive classifier. Active learning techniques include selecting sample images from the group of images for labeling by one or more human users.

While active learning techniques prove effective to label large groups of elements, these techniques suffer from failing to consider the distribution difference of the sampled images between the training and the test. As such, the techniques may not produce an accurately-trained model.

SUMMARY

This document describes tools for creating a high performance active-learning model that takes into account a sample selection bias of elements selected for labeling by a user. These tools select a first set of elements for labeling. Once a user labels these elements, the tools calculate a sample selection bias of the selected elements and train a model that takes into account the sample selection bias. The tools then select a second set of elements based, in part, on a sample selection bias of the selected elements. Again, once a user labels the second set of elements the tools train the model while taking into account the calculated sample selection bias. Once the trained model satisfies a predefined stop condition, the tools use the trained model to predict labels for the remaining unlabeled elements.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
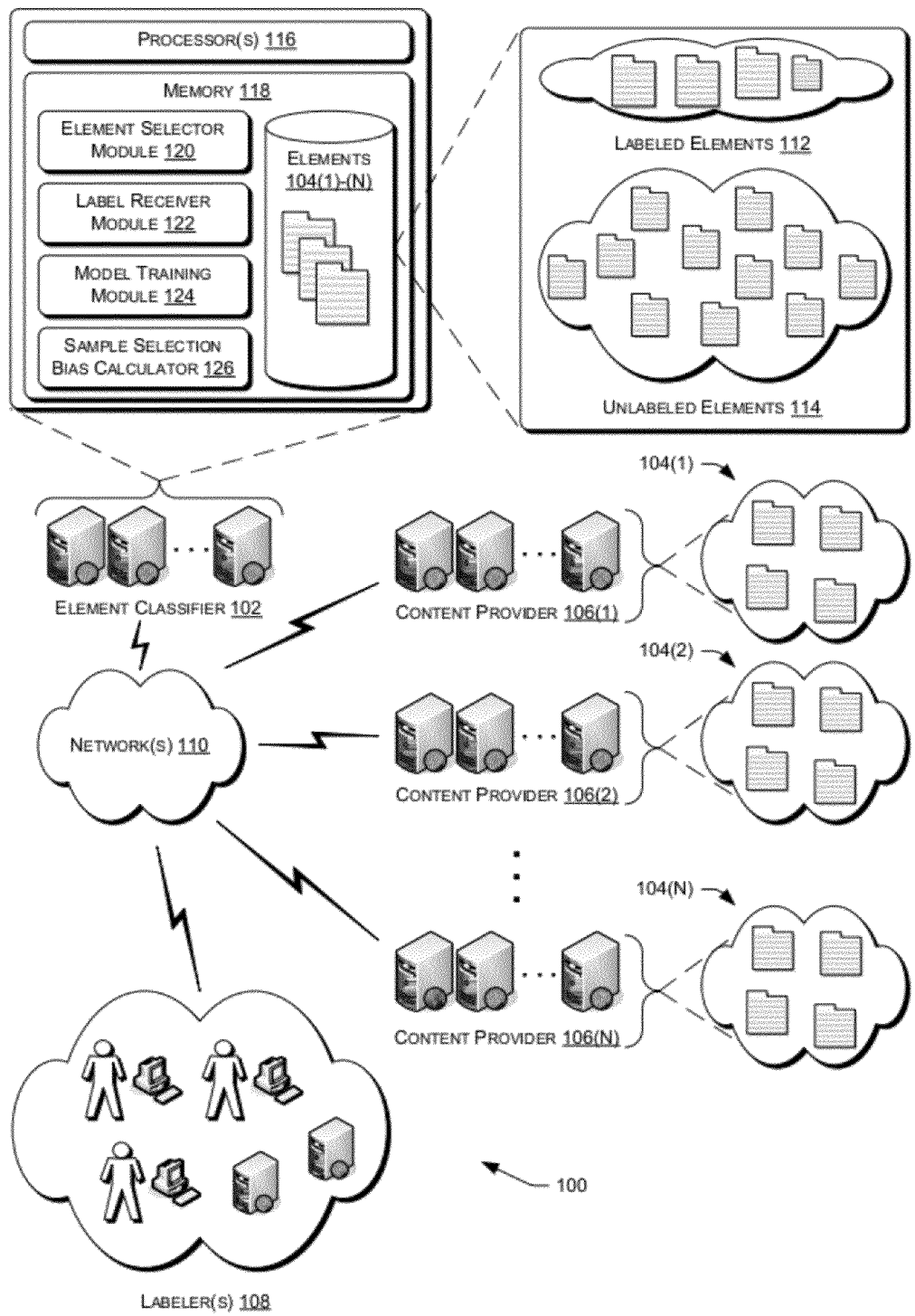
FIG. 1 depicts an illustrative architecture in which an element classifier trains a model for predicting element labels. Here, the element classifier takes into account a sample selection bias when selecting sample elements for labeling and when training the model.

This document describes tools for creating a high performance active-learning model that takes into account a sample selection bias of elements selected for labeling by a user. These tools select a first set of elements for labeling. Once a user labels these elements, the tools calculate a sample selection bias of the selected elements and train a model that takes into account the sample selection bias. The tools then select a second set of elements based, in part, on a sample selection bias of the images. Again, once a user labels the second set of elements the tools train the model while taking into account the calculated sample selection bias. Once the trained model satisfies a predefined stop condition, the tools use the trained model to predict labels for the remaining unlabeled elements.

For instance, imagine that an entity such as a search engine wishes to label millions of images available on the web as being related or not being related to a search query "Animal." That is, the search engine may wish to categorize each of these images as either including an animal or not including an animal, such that when a user submits the search query "Animal" the search engine is able to accurately return images that include animals.

To label these images, the search engine may engage in an unbiased active learning process that trains a model based on the labeling of a small portion of images and then uses the trained model to predict labels for the remaining images. First, the search engine may select a first set of images for labeling by one or more human users. These human users may then indicate whether or not each of these images includes an animal. Once the users return the labels for these images, the search engine may begin to train a model based on this data.

Next, the search engine may select a second set of images for labeling by the human users. When doing so, the search engine may take into account a sample selection bias of the selected images. For instance, the search engine may select samples that occur in a location that is heavy in unlabeled images or test data and sparse in labeled images or training data. Once selected, the human users may label the images as including or not including an animal. Once the search engine receives these labels, the search engine may again train the model using the data. Further, the search engine may take into account the sample selection bias of the images when training the model.

The search engine may repeat the selecting of the images (while taking into account the sample selection bias), the sending of the images for labeling by the human users, and the training of the model (while taking into account the sample selection bias) until the trained model satisfies a predefined stop condition. At this point, the search engine may use the trained model to predict labels for the remainder of the unlabeled images. By taking into account the sample selection bias of the sampled images, the described techniques create a model that more accurately predicts the labeling of the images.

The discussion begins with a section entitled "Illustrative Architecture," which describes one non-limiting environment that may implement the claimed tools. A second section, entitled "Illustrative Flow Diagram," pictorially illustrates an unbiased active learning process for training a model for predicting labels of elements, such as images. The discussion then concludes with a section that describes an "Illustrative Process" for implementing the described techniques. This brief introduction, including section titles and corresponding summaries, is provided for the reader's convenience and is not intended to limit the scope of the claims, nor the proceeding sections.

Illustrative Architecture

FIG. 1 depicts an illustrative architecture 100 that may employ the described techniques. As illustrated, architecture 100 includes an element classifier 102 that engages in an active learning process for the purpose of predicting labels of multiple elements 104(1), 104(2), ..., 104(N) provided by one or more content providers 106(1), 106(2), ..., 106(N). Elements 104(1)-(N) may comprise images, documents, search queries, audio files, video files, or any other element that may require classification. For instance, element classifier 102 may comprise a search engine that attempts to predict labels for a group of images as discussed above.

Architecture 100 further includes one or more labelers 108 that may receive sample elements from element classifier 102 and, in response, provide labels for these sample elements. For instance, labelers 108 may state whether each of the received sample elements (e.g., images) includes an animal, a car, a phone, or any other specified object. With use of these labels, elements classifier 102 may train a model for the purpose of predicting labels for the remaining elements that labelers 108 do not label.

As illustrated, labelers 108 may include human users operating client computing devices that couple with element classifier 102 via a network 110. These client computing devices may include an array of computing devices, such as personal computers, laptop computers, mobile phones, set-top boxes, game consoles, personal digital assistants (PDAs), portable media players (PMPs) (e.g., portable video players (PVPs) or digital audio players (DAPs)), and the like. In addition or in the alternative to human users, labelers 108 may include one or more computing devices in some instances. Network 110, meanwhile, may comprise the Internet, a Local Area Network (LAN), a Wide Area Network (WAN), a wireless network, and/or the like. Furthermore, while FIG. 1 illustrates labelers 108 and classifier 102 coupled by network 110, in other instances these entities may simply be integral with one another.

As illustrated, element classifier 102 stores or otherwise has access to elements 104(1)-(N) for the purpose of predicting labels for these elements. Also as illustrated, elements 104(1)-(N) include elements 112 that labelers 108 have labeled, as well as elements 114 that labelers 108 have not labeled. With use of labeled elements 112, element classifier 102 predicts labels for unlabeled elements 114.

In order to predict these labels, element classifier 102 includes one or more processors 116 and memory 118. Memory 118 stores or otherwise has access to an element selector module 120, a label receiver module 122, a model training module 124, and a sample selection bias calculator 126. Element selector module 120 functions to select sample elements for labeling by labelers 108. As discussed in detail below, element selector module 120 may select sample elements with reference to a sample selection bias of the elements that sample selection bias calculator 126 provides. That is, module 120 may select elements based on where on the distribution of elements 104(1)-(N) the sample elements reside.

Once selected, element classifier 102 provides these sample elements to labelers 108 for labeling. Once labelers 108 label the elements, label receiver module 122 receives these labels. Model training module 124 then uses these received labels in order to train a model or a classifier for predicting labels of unlabeled elements 114. Also as discussed in detail below, model training module 124 may take into account the sample selection bias of the elements when training the model. Finally, after training of the model, element classifier 102 may determine whether the trained model meets a predefined stop condition. If so, element classifier 102 predicts labels for unlabeled elements 114 with use of the model. If not, element classifier 102 repeats the selecting of more sample elements (with reference to the sample selection bias), the receiving of the labels of these elements from labelers 108, and the training of the model with use of the received labels (with reference to the sample selection bias). When the trained model meets the predefined stop condition, element classifier 102 predicts labels for unlabeled elements 114 with use of the model.

Illustrative Flow Diagram

Figure 2:
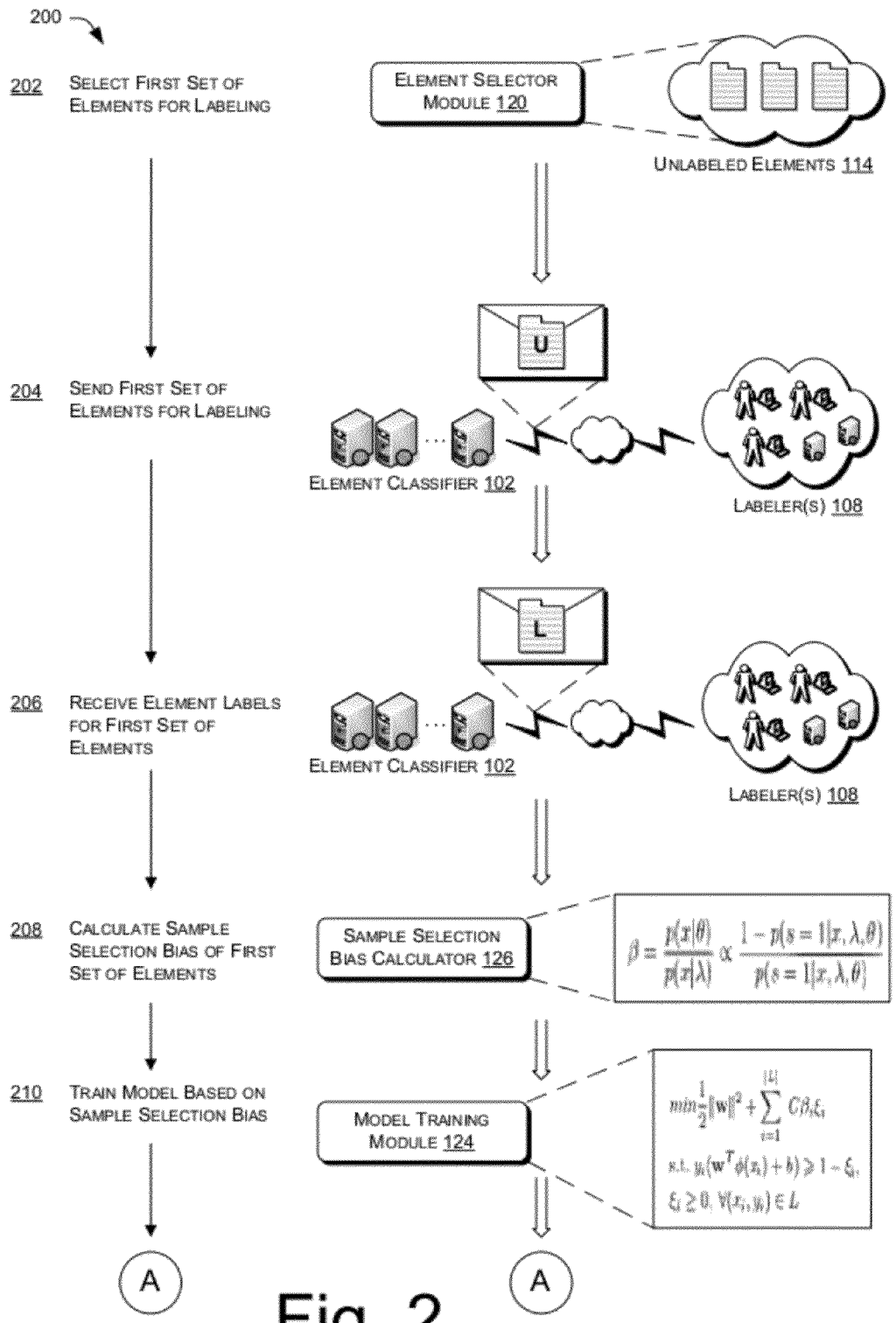
FIGS. 2-4 depict an illustrative flow diagram for predicting element labels by training a model that takes into account a sample selection bias of the sample elements. Again, this process also takes into account the sample selection bias when selecting sample elements for labeling by users.
Figure 3:
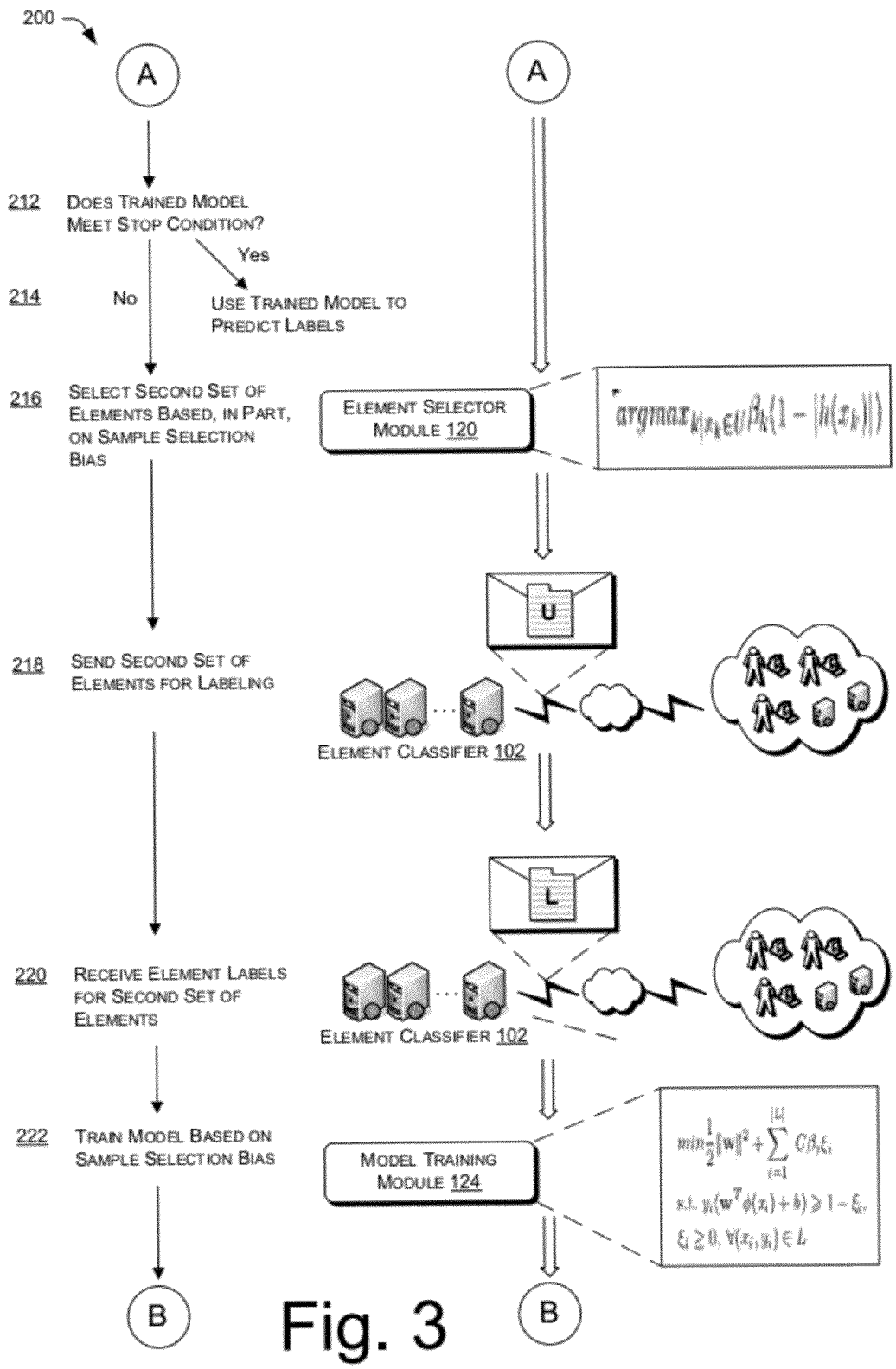
Figure 4:
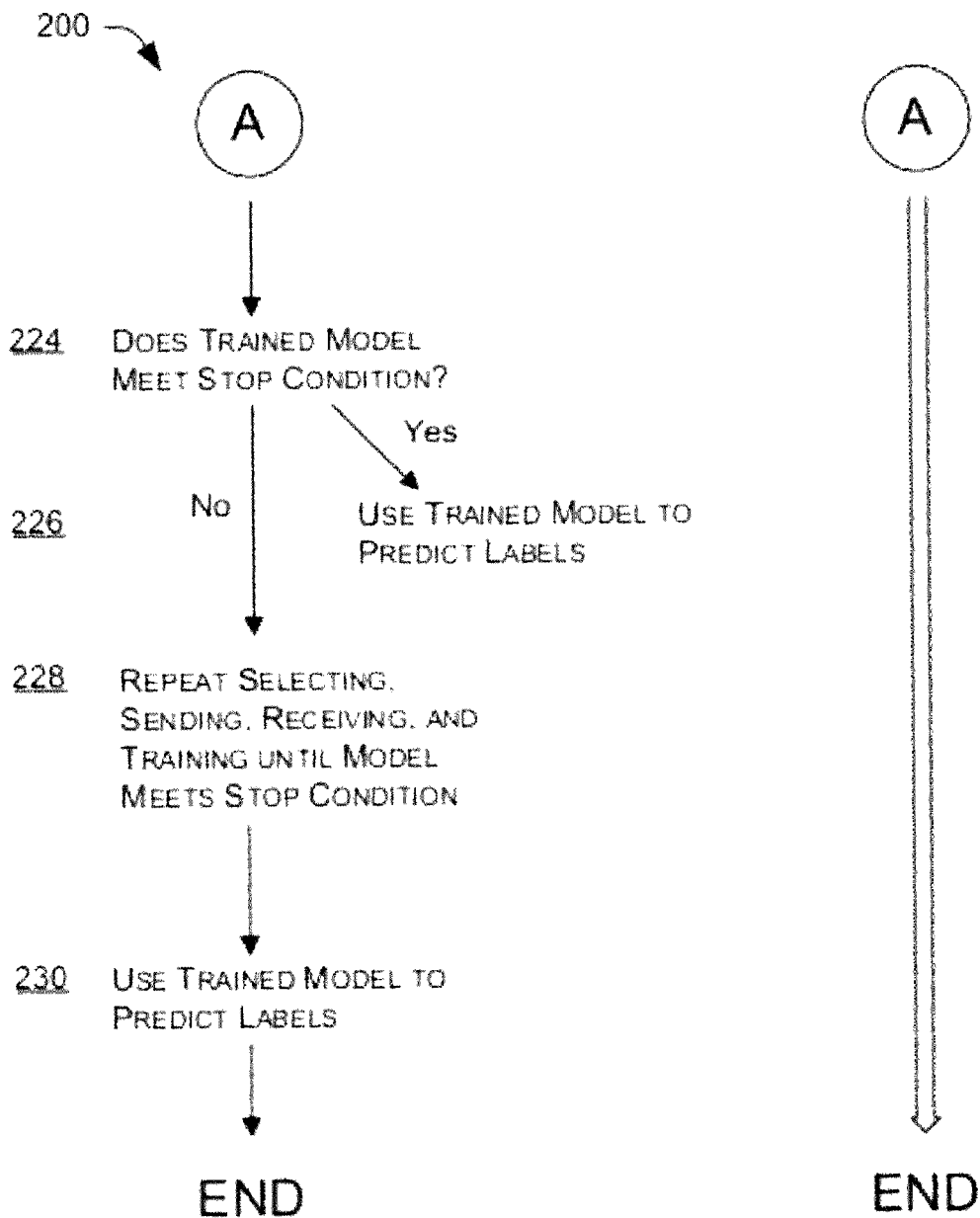

FIGS. 2-4 depict an illustrative process 200 for creating an accurate active-learning model that takes into account a sample selection bias of elements, such as images, selected for labeling by a user. This process, as well as other processes described throughout this document, is illustrated as a logical flow graph, which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 200 strives to predict labels for elements 104(1)-(N), which includes a labeled set $L=\{(x_1, y_1), (x_2, y_2), \ldots, (x_M, y_M)\}$ and an unlabeled set $U=\{(x_1, y_1), (x_2, y_2), \ldots, (x_N, y_N)\}$, where $x_i \in Rd$ is the d-dimensional feature vector, $y_i \in \{-1, 1\}$ is the label, and the labels are unknown for the samples in U. This process repeatedly selects samples from U (unlabeled elements 114) for labeling and then adds them to L (labeled elements 112) to re-train a new classifier or model. Further, this process may assume that the samples in L and U are governed by the distribution $p(x, y|\lambda)$ and $p(x, y|0)$, respectively. The objective is to predict the remaining samples in the unlabeled set U with minimal expected risk, as illustrated by equation one below:

$$\min f_L \text{loss}(f,x,y)p(x,y|0)d(x,y) \qquad (1)$$

where loss(f, x, y) is a loss function.

Since the labels of the samples in U are unknown, the objective in (1) cannot be directly computed in some instances. Thus equation (1) can be transformed into the following computationally tractable form:

$$\min f_L \text{loss}(f,x,y)p(x,y|\lambda)\beta d(x,y) \qquad (2)$$

where $\beta=[p(x, y|0)]/[p(x, y|\lambda)]=[p(y|x,\theta)p(x|\theta)]/[p(y|x,\lambda)p(x|\lambda)]$ The formula (2) means that the prediction error of unlabeled elements 114 may be estimated by estimating the error on the training data (or labeled elements 112). Considering the distribution difference, a weight factor for each sample is added to re-weight the loss with respect to the distribution difference. Based on the assumption that there does not exist concept drifting, namely $p(y|x,0)=p(y|x, \lambda)$, $\beta$ can be transformed to $p(x|\theta)/p(x|\lambda)$. This distribution ratio is also called a "sample selection bias." Previous active learning frameworks assume that the selected labeled set are governed by a distribution that is the same with the unlabeled set, namely $\beta=1$ for all training samples. This assumption, however, is inevitably violated as samples are selected according to particular strategies like close-to-boundary. The bias problem caused by the distribution difference may lead to a classifier with poor performance when predicting labels for unlabeled elements 114. Moreover, the subsequent sample selection is also affected since it is directly related to the learned classifier. Process 200, therefore, takes into account this sample selection bias when selecting sample elements for labeling and when training the model for predicting labels for unlabeled elements 114.

The following algorithm, named unbiased active learning, is motivated to introduce the sample selection bias so that the distribution difference is treated explicitly. The algorithm iteratively estimates the bias, learns the classifier (or model) f, and then selects samples to label for the next round learning, until the stop condition is met. At each round, the sample selection bias is not only considered as a weight factor in the learning of classifier, but also in the sample selection strategy.

Process 200 includes operation 202, at which point element classifier 102 (and more particularly element selector module 120) from FIG. 1 selects a first set of unlabeled elements for labeling. Next, operation 204 sends the selected elements to labelers 108 (e.g., one or more human users) for labeling. After labelers 108 perform this task, element classifier 102 receives the labels for the first set of elements from labelers 108 at operation 206. Next, operation 208 calculates the sample selection bias of the first set of selected elements in order to take this sample selection bias into account when training the model or classifier.

One possible manner in which to estimate the sample selection bias is to firstly estimate the distributions of labeled and unlabeled sets respectively based on some known methods, such as kernel density estimation, and then compute the ratio. However, due to the difficulty of estimating the distribution, this approach may obtain inaccurate results. Therefore, instead of estimating the bias in two steps, the described techniques adopt a previously proposed method, which estimates the bias in one step without explicitly estimating the distributions.

First, a new set T is constructed, which is the union of the labeled and unlabeled sets, i.e. $T=U \cup L$. Then, a binary selection variable s is introduced to represent whether a sample is drawn from L or U, and $s \in \{0, 1\}$. Given a sample x that is randomly selected from T, the probability of x coming from L is denoted as $p(s=1|x, \lambda, \theta)$. Similarly, the probability that x is from U is denoted as $p(s=0|x, \lambda, \theta)$. The following equation, then, holds:

$$\beta = p(x|\theta)/p(x|\lambda) \alpha [1-p(s=1|x,\lambda,\theta)]/[p(s=1|x,\lambda,\theta)] \quad (3)$$

The above formula leaves the problem of learning probability $p(s=1|x, \lambda, \theta)$. If s is taken as a binary label, $p(s=1|x, \lambda, \theta)$ could be estimated by a classification task, which learns to discriminate samples from L and those from U. A Support Vector Machine (SVM) may be used for learning due to its good classification performance, where a sigmoid function $p(s=1|x, \lambda, \theta)=1/[1+\exp(-Ag(x))]$ is employed to transform the classifier output g(x) into probability form. A, meanwhile, is a positive constant for controlling the rescale degree while g is a function. After obtaining $p(s=1|x, \lambda, \theta)$, $\beta$ (the sample selection bias) may be computed trivially according to equation (3).

Once operation 208 estimates the sample selection bias, operation 210 trains or learns the classifier or model over the training set L, whose samples are re-weighted by the bias factor. As discussed above, this learning strategy will minimize the expected risk over unlabeled set. The re-weighting may be achieved by giving different penalties to the loss caused by each training sample $x_i \in L$, according to its bias factor $\beta_i$ estimated as discussed above. Here, the re-weighted SVM may be utilized for training the model (or "learning the classifier") as follows:

$$\min \tfrac{1}{2}\|w\|^2 + \Sigma^{|L|}_{i=1} C\beta_i \epsilon_i$$

$$s.t. y_i(W^T\phi(x_i)+b) \geq 1-\epsilon_i$$

$$\epsilon_i \geq 0, \forall (x_i, y_i) \in L \quad (4)$$

where w, b are the classifier parameters, and $\phi(x)$ is the feature mapping from original space into kernel space.

After optimizing the objective in equation (4), the decision function will take the from $f(x)=w^T\phi(x)+b$.

FIG. 3 continues the illustration of process 200. After training the model or classifier while taking into account the sample selection bias, operation 212 queries whether the trained model satisfies a predefined stop condition. This stop condition could comprise a predefined number of samples or an error threshold. For instance, element classifier 102 could use the trained model on a number of unlabeled elements. The element classifier 102 may then compare the results with the actual results (e.g., by having labelers 108 label the predicted samples). Then, if the resulting error is less than a predefined threshold, operation 212 may determine that the trained model satisfies the stop condition. If so, operation 214 then uses the trained model to predict labels from unlabeled elements 114.

If, however, the trained model does not satisfy a predefined stop condition, then process 200 proceeds to operation 216. Here, element selector module 120 selects a second set of elements for labeling by labelers 108 with reference to the sample selection bias of these elements. Traditional methods select sample elements with the most uncertainty, whose prediction loss will be reduced to zero after labeling. However, it is the risk of the whole unlabeled set which will be reduced by training a better model from the labeled sample (instead of the labeled sample's own expected loss) that should be examined and used in selecting sample elements. Thus, based on the objective (2), the described techniques select the sample that contributes most to learning the new classifier:

$$\mathrm{argmax}_k|_{xk \in U} \beta_k E_{yk}[\mathrm{loss}(f, x_k, y_k)] \quad (5)$$

Here, $\beta_k$ is the sample selection bias that may be estimated according to equation (3) above. $E_{yk}[\mathrm{loss}(f, x_k, y_k)]$, meanwhile, represents the loss expected over label $y_k$ for sample $x_k$. Next, suppose, that the square loss function $\mathrm{loss}(f, x, y) = (y-\hat{y})^2$ is adopted, where $\hat{y} = \mathrm{sign}(f(x))$ is the estimated label, the above selection strategy becomes the following:

$$\mathrm{argmax}_k|_{xk \in U} \beta_k E(p(y_k=1|x_k)(1-\hat{y}_k)^2 + \quad (6)$$
$$p(y_k=-1|x_k)(1+\hat{y}_k)^2)$$

When $p(y_k|x_k)$ is approximated with $p(y_k|x_k, f)$ (assuming that f is well learned), then the following equation is determined:

$$h(x_k) = p(y_k=1|x_k, f) - p(y_k=-1|x_k, f) \quad (7)$$

Finally, by substituting $p(y_k|x_k, f)$ and then $h(x_k)$ into equation (6), the final selection strategy may comprise the following:

$$\text{argmax}_{k|x_k \in U} \beta_k(1-|h(x_k)|) \quad (8)$$

The selection strategy could be explained from two perspectives: (a) the selection strategy is based on a close-to-boundary criterion, corresponding to the term $(1-|h(x_k)|)$; and (b) the selection strategy is based on choosing the sample with a large sample selection bias, $\beta_k$. For situations that labeled samples and unlabeled samples are under the same distribution, i.e. $\beta_k=1$ for all the labeled samples, the sample selection strategy becomes the existing active learning selection criterion, close-to-boundary.

However, if the sample element that is closest to the classifier boundary is sparse in the unlabeled set, this labeling may not be helpful for reducing the risk of the whole set. Furthermore, suppose that the close-to-boundary sample element is located in a dense part of labeled set, where the classifier or model is already well learned. Here, this labeling may provide little contribution for learning the new classifier or model. Thus, by incorporating the sample selection bias, the described techniques prefer the sample with larger density in unlabeled set and less density in labeled set. In other words, the described techniques prefer selecting a sample element with a high sample selection bias ($\beta_k$) that is more representative in unlabeled set, but still scarce in the labeled set for training.

Once operation 216 selects a second set of elements based, at least in part, on the sample selection bias as discussed immediately above, operation 218 sends these elements for labeling to labelers 108. Operation 220 then receives the labels from labelers 108 and operation 222 trains the model based on the received labels and based on the calculated sample selection bias.

FIG. 4 continues the illustration of process 200 and includes operation 224. Here, this operation again queries whether the trained model satisfies a predefined stop condition. If so, operation 226 uses the trained model to predict labels for unlabeled elements 114. If not, operation 228 repeats the selecting of the elements based on the sample selection bias, the sending of the elements to the labelers, the receiving of the labels, and the training of the model based on the received labels and on the calculated bias until the trained model satisfies the stop condition. At this point, operation 230 uses the trained model to predict labels for unlabeled elements 114.

Illustrative Processes

Figure 5:
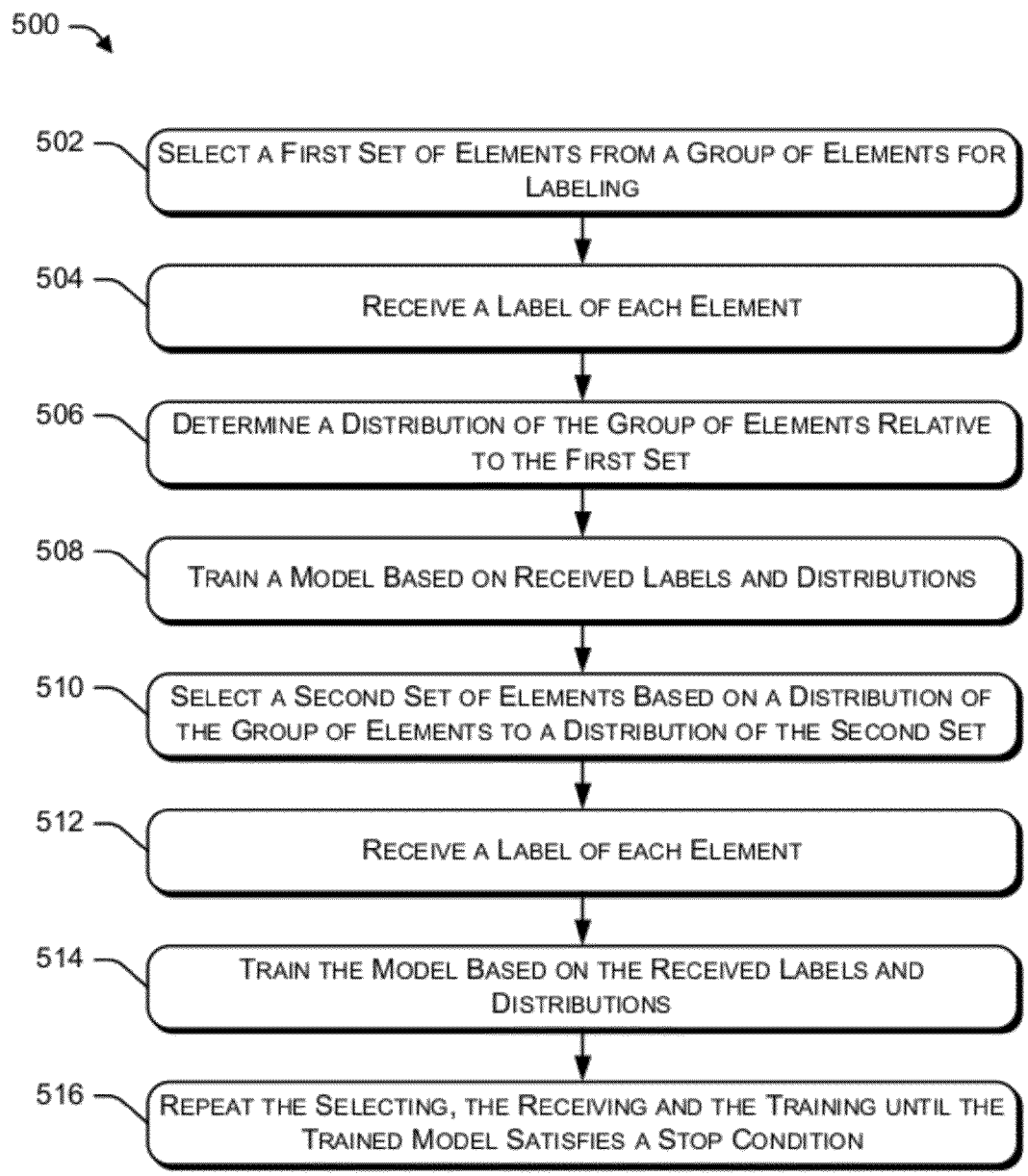
FIG. 5 illustrates an example process for employing the described techniques.

FIG. 5 describes an example process 500 for employing the unbiased active learning techniques discussed immediately above. Process 500 includes an operation 502, which selects a first set of elements from a group of elements for labeling by one or more human users. When selecting this first set of elements, operation 502 may select these samples randomly since no trained classifier yet exists and no information regarding a sample distribution is known. This group of elements may include images, documents, audio files, video files, search queries, or anything else that may be classified. For instance, operation 502 may select a set of unlabeled images for labeling by labelers 108. Next, operation 504 receives a label of each element of the selected first set of elements from the one or more human users. In some instances, this label comprises a binary value (e.g., whether or not the image includes an animal or other specified object), while in other instances this label may not. Next, operation 506 determines a distribution of the group of elements relative to a distribution of the selected first set of elements. For instance, operation 506 may determine a sample selection bias of the first set of elements, which may comprise a determination of the ratio of these distributions.

Next, operation 508 trains a model or learns a classifier based at least in part on: (i) the received labels of the selected first set of elements, and (ii) the distribution of the group of elements relative to the distribution of the selected first set of elements. After training the model, operation 510 selects a second of elements from a group of elements for labeling by one or more human users. In some instances, this selecting is based at least in part on the distribution of the group of elements relative to a distribution of the second set of elements (i.e., the sample selection bias of the second set of elements). In some instances, the selecting of the second set of elements comprises selecting elements where a ratio of the distribution of the group of elements to the distribution of the selected second set of elements is relatively large when compared with other elements of the group of elements. That is, operation 510 may select elements from an area that is sparse in training data (i.e., labeled elements) and dense in test data (i.e., unlabeled elements).

Operation 512, meanwhile, receives a label of each element of the selected second set of elements from the one or more human users. Next, operation 514 again trains a model based at least in part on: (i) the received labels of each element of the selected second set of elements, and (ii) the distribution of the group of elements relative to the distribution of the selected second set of elements. Finally, operation 516 repeats the selecting of a set of elements, the receiving of the labels, and the training of the model until a trained model satisfies a stop condition. At this point, the trained model may be used to predict labels for the remaining unlabeled elements.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. One or more computer-readable media storing computer-executable instructions that, when executed on one or more processors, cause the one or more processors to perform acts comprising:

selecting a first set of elements from a group of elements for labeling by one or more human users;

receiving a label of each element of the first set of elements from the one or more human users;

determining a sample selection bias of the first set of elements;

training a model for predicting labels based at least in part on the received labels of the selected first set of elements, and the sample selection bias of the first set of elements;

determining a sample selection bias of a second set of elements;

selecting the second set of elements from a group of elements for labeling by one or more human users, the selecting based at least in part on the sample selection bias of the second set of elements;

receiving a label of each element of the second set of elements from the one or more human users;

training a model for predicting labels based at least in part on the labels of each element of the second set of elements, and the sample selection bias of the second set of elements; and repeating the determining of the sample selection bias, the selecting of a set of elements, the receiving, and the training until a trained model satisfies a stop condition, wherein the stop condition comprises a predefined number of elements being labeled by the one or more human users or an error threshold is reached.

2. One or more computer-readable media as recited in claim 1, wherein the selecting of the second set of elements comprises selecting elements where a ratio of the distribution of the group of elements to the distribution of the second set of elements is relatively large when compared with other elements of the group of elements.

3. One or more computer-readable media as recited in claim 1, wherein the label for each element comprises a binary value.

4. One or more computer-readable media as recited in claim 1, wherein the selecting of the second set of elements comprises maximizing a function that is based on the sample selection bias and the uncertainty of each respective element.

5. One or more computer-readable media as recited in claim 1, wherein the selecting is carried out in part with a close-to-boundary strategy.

6. One or more computer-readable media storing computer-executable instructions that, when executed on one or more processors, cause the one or more processors to perform acts comprising:

selecting a first set of elements from a group of elements for labeling by one or more human users;

receiving a label for each element of the first set of elements from the one or more human users;

determining a sample selection bias of the first set of elements; and training a model for predicting labels for each element of the group of elements, the training based at least in part on the labels and on the sample selection bias.

7. One or more computer-readable media as recited in claim 6, further storing computer-executable instructions that, when executed on the one or more processors, cause the one or more processors to perform an act comprising selecting a second set of elements from the group of elements for labeling by the one or more human users, the selecting based at least in part on a sample selection bias of the second set of elements.

8. One or more computer-readable media as recited in claim 7, wherein the selecting of the second set of elements comprises maximizing a function that is based at least in part on the sample selection bias of the second set of elements and the uncertainty of each respective element.

9. One or more computer-readable media as recited in claim 6, wherein the elements of the group of elements comprise images, documents, audio files, video files, or search queries.

10. One or more computer-readable media as recited in claim 6, wherein the determining of the sample selection bias comprises determining a distribution of the group of elements relative to a distribution of the selected first set of elements.

11. One or more computer-readable media as recited in claim 6, further storing computer-executable instructions that, when executed on the one or more processors, cause the one or more processors to perform an act comprising predicting a label for multiple elements of the group of elements based at least in part upon the trained model.

12. One or more computer-readable media as recited in claim 6, further storing computer-executable instructions that, when executed on the one or more processors, cause the one or more processors to perform an act comprising repeating the selecting, the receiving, the determining, and the training until a trained model satisfies a stop condition.

13. One or more computer-readable media storing computer-executable instructions that, when executed on one or more processors, cause the one or more processors to perform acts comprising:

selecting a set of elements having a sample selection bias from a group of elements for labeling by one or more human users, the selecting based at least in part on a sample selection bias of the set of elements;

receiving a label for each element of the set of elements from the one or more human users; and training a model for predicting labels for each element of the group of elements, the training based at least in part on the labels for the set of elements received from the one or more human users.

14. One or more computer-readable media as recited in claim 13, wherein the training of the model is also based at least in part on the sample selection bias of the set of elements.

15. One or more computer-readable media as recited in claim 13, wherein the sample selection bias is based at least in part on a distribution of the group of elements relative to a distribution of the selected first set of elements.

16. One or more computer-readable media as recited in claim 15, wherein the selecting of the set of elements comprises selecting elements where a ratio of the distribution of the group of elements to the distribution of the selected set of elements is relatively large when compared with other elements of the group of elements.

17. One or more computer-readable media as recited in claim 13, wherein the set of elements comprises a first set of elements, and further storing computer-executable instructions that, when executed on the one or more processors, cause the one or more processors to perform acts comprising:

determining if the trained model satisfies a predefined stop condition;

if the trained model satisfies the predefined stop condition, using the trained model to predict a label for multiple elements of the group of elements;

otherwise:

selecting a second set of elements from the group of elements for labeling by the one or more human users, the selecting based at least in part on a sample selection bias of the second set of elements;

receiving a label for each element of the second set of elements from the one or more human users; and training a model for predicting labels for each element of the group of elements, the training based at least in part on the labels for the second set of elements received from the one or more human users and on the sample selection bias of the second set of elements.

18. One or more computer-readable media as recited in claim 13, wherein the selecting of the set of elements is also based at least in part on an uncertainty of each element of the set of elements.

19. One or more computer-readable media as recited in claim 18, wherein the selecting of the set of elements comprises maximizing a function that is based on the sample selection bias and the uncertainty of each respective element.

20. One or more computer-readable media as recited in claim 17, wherein the predefined stop condition is an error threshold, and wherein the error threshold is based at least in part on comparing results of labeling utilizing the trained model with results of actual labeling.

* * * * *